(12) United States Patent
Levine et al.

(10) Patent No.: US 11,813,808 B2
(45) Date of Patent: Nov. 14, 2023

(54) CLOSED COMPOSITE CHANNEL WITH A BARRIER FOR BLOCKING THE FLOW OF FLUID

(71) Applicant: The Boeing Company, Chicago, IL (US)

(72) Inventors: Daniel Mackenzie Levine, Seattle, WA (US); Garrett Charles Hanson, Everett, WA (US); Christopher Loesche, Bothell, WA (US); Steve Patterson, Renton, WA (US); Yrret Maldonado, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 864 days.

(21) Appl. No.: 16/674,155

(22) Filed: Nov. 5, 2019

(65) Prior Publication Data
US 2021/0129457 A1    May 6, 2021

(51) Int. Cl.
*B29C 70/42* (2006.01)
*B29C 65/48* (2006.01)
*B29C 65/00* (2006.01)
*B29L 31/30* (2006.01)

(52) U.S. Cl.
CPC .............. *B29C 70/42* (2013.01); *B29C 65/48* (2013.01); *B29C 66/131* (2013.01); *B29L 2031/3076* (2013.01)

(58) Field of Classification Search
None
See application file for complete search history.

(56) References Cited

U.S. PATENT DOCUMENTS

| | | |
|---|---|---|
| 9,010,689 B1 | 4/2015 | Brook et al. |
| 9,382,014 B2 | 7/2016 | Brook |
| 9,944,402 B2 | 4/2018 | Perez Diaz et al. |
| 10,279,922 B2 | 5/2019 | Perez Diaz et al. |
| 2015/0239570 A1 | 8/2015 | Brook |
| 2020/0001971 A1* | 1/2020 | Douglas ................ B29C 70/446 |

* cited by examiner

*Primary Examiner* — Jacob T Minskey
(74) *Attorney, Agent, or Firm* — Vivacqua Crane PLLC

(57) ABSTRACT

A method of joining an interior wall and a composite channel together is disclosed. The method includes wrapping one or more first composite plies around a first end portion of a first mandrel and wrapping one or more second composite plies around a second end portion of a second mandrel. The method includes positioning the one or more first composite plies located on the first end portion of the first mandrel against the one or more second composite plies located on the second end portion of the second mandrel to create the interior wall, and inserting the first mandrel and the second mandrel into a passageway of a composite channel. The interior wall created by the one or more first composite plies and the one or more second composite plies creates a barrier to block a flow of fluid within the passageway of the composite channel.

20 Claims, 12 Drawing Sheets

CLOSED COMPOSITE CHANNEL WITH A BARRIER FOR BLOCKING THE FLOW OF FLUID

INTRODUCTION

The present disclosure relates to a closed composite channel and methods of making the closed composite channel. More particularly, the present disclosure relates to a closed composite channel having an interior wall that acts as a barrier that blocks the flow of fluid.

BACKGROUND

An aircraft includes stringers for providing structural reinforcement to the aircraft's wing panels. Some stringers, which are referred to as fuel vent stringers, may also act as a conduit for venting fuel and fuel vapors from the aircraft's wing fuel tanks. Fuel vent stringers are part of an aircraft's fuel tank cross-ventilating system. A fuel vent stringer defines a hollow internal channel that allows for the passage of the fuel and the fuel vapors. One or more vent dams may be placed within the internal channel of the fuel vent stringer. The vent dams act as boundaries or barriers to separate the wing fuel tanks from other systems within the aircraft.

Vent dams are usually installed within an internal channel of the vent stringer mechanically using fasteners and seals. Installing the vent dam is usually a time consuming and labor intensive process. For example, the inner wall of the internal channel of the vent stringer is first prepared using a surface finishing technique such as, but not limited to, sanding, priming, and painting. Then, after preparing the surface of the inner wall, various seals may be applied between the fuel vent stringer and the vent dam such as, for example, fay seals and fillet sealants. In addition to seals, sometimes fasteners may also be used to secure the vent dam within the hollow internal channel of the vent stringer.

In addition to the above-mentioned issues, sometimes it may be awkward or uncomfortable for an individual to install the vent dam within the internal channel of the vent stringer. This is because the inside wall of the internal channel of the vent stringer is typically only accessible through an opening located along an outer surface of the vent stringer. This means that an individual has to apply the sealant and fasteners through the opening in the outer surface of the fuel vent stringer as well. Finally, if the opening in the fuel vent stringer is relatively small in size or irregular in shape, it may be especially challenging for an individual to access the inner wall of the vent stringer.

SUMMARY

According to several aspects, a method of joining an interior wall and a composite channel together is disclosed. The method includes wrapping one or more first composite plies around a first end portion of a first mandrel and wrapping one or more second composite plies around a second end portion of a second mandrel. The method also includes positioning the one or more first composite plies located on the first end portion of the first mandrel against the one or more second composite plies located on the second end portion of the second mandrel to create the interior wall. The method further includes inserting the first mandrel and the second mandrel into a passageway of a composite channel, where the interior wall created by the one or more first composite plies and the one or more second composite plies creates a barrier to block a flow of fluid within the passageway of the composite channel. The method also includes placing a composite panel over an open section of the passageway of the composite channel to close off the passageway. The method also includes attaching the composite panel to the composite channel, and attaching the interior wall created to an innermost surface defined by the passageway of the composite channel.

In another aspect, a method of joining an interior wall and a composite channel together is disclosed. The method includes wrapping one or more first composite plies around a first end portion of a first mandrel. The method also includes positioning the one or more first composite plies located on the first end portion of the first mandrel against a second end portion of a second mandrel to create the interior wall. The method also includes inserting the first mandrel and the second mandrel into a passageway of a composite channel, where the interior wall created by the one or more first composite plies creates a barrier to block a flow of fluid within the passageway of the composite channel. The method also includes placing a composite panel over an open section of the passageway of the composite channel to close off the passageway. The method also includes attaching the composite panel to the composite channel, and attaching the interior wall created to an innermost surface defined by the passageway of the composite channel.

In still another aspect, a vent stringer assembly for a wing of an aircraft is disclosed. The vent stringer assembly includes a fuel vent stringer constructed of composite material, where the fuel vent stringer is a passageway that defines a passageway having an innermost surface, a first open end, and a second open end. The vent stringer assembly also includes an interior wall disposed within the passageway of the fuel vent stringer, where the interior wall creates a barrier that blocks a flow of fluid within the passageway. The interior wall is constructed of composite material and defines an outermost surface that is contiguous with the innermost surface of the passageway. The vent stringer assembly also includes a composite panel attached to the fuel vent stringer, where the composite panel closes off an open section of the passageway of the fuel vent stringer.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a closed composite channel and methods of making the closed composite channel. The closed composite channel includes an interior wall, a composite panel, and a composite channel that are joined to one another. The interior wall is integrated into the composite channel without using sealants or fasteners. The disclosure also describes various methods of joining the interior wall and the composite channel together. It is to be appreciated that the interior wall is joined to the composite channel prior to the composite panel closing off the passageway of the composite channel, which is unlike some conventional systems that require an individual to install an interior wall or dam through an opening in the composite channel.

The following description is merely exemplary in nature and is not intended to limit the present disclosure, application, or uses.

Figure 1:
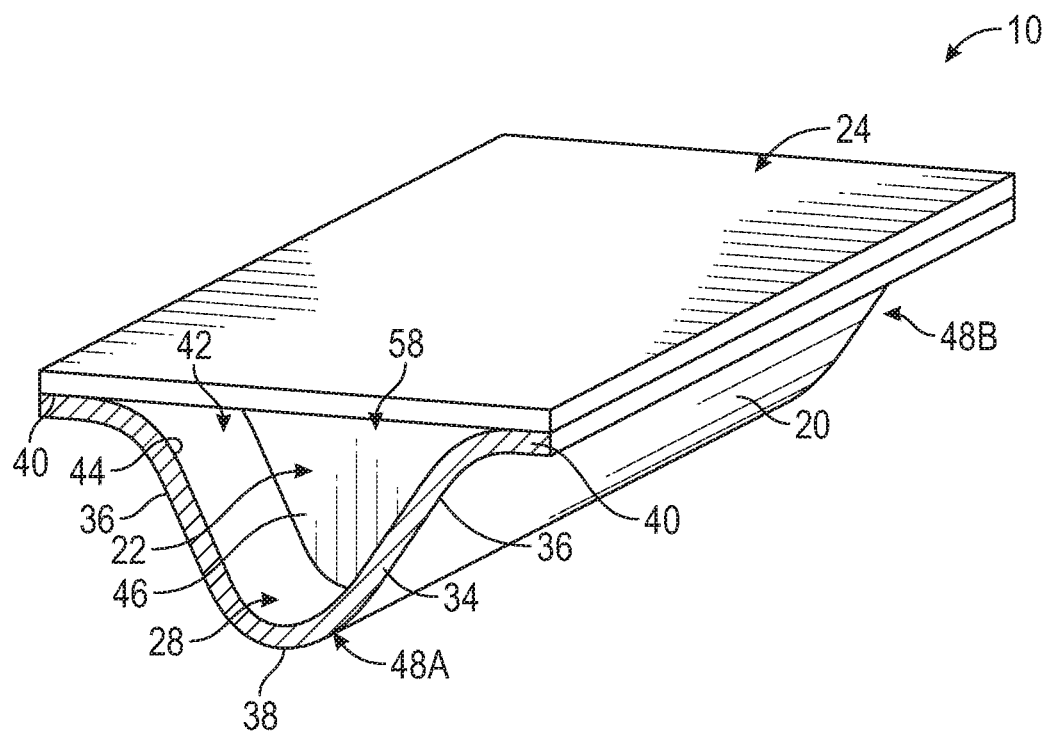
FIG. 1 is a perspective view of a composite channel, an interior wall, and a composite panel that are joined together to create a closed composite channel, according to an exemplary embodiment.

Referring to FIG. 1, an exemplary closed composite channel 10 is illustrated. The closed composite channel 10 includes a composite channel 20, an interior wall 22, and a composite panel 24. The composite channel 20 defines a passageway 28 configured to transport fluid. It is to be appreciated that the fluid may be a liquid or gas. The interior wall 22 is located within the composite channel 20 and blocks a flow of fluid within the composite channel 20. As explained in detail below, the interior wall 22 is integrated with the composite channel 20 without using fasteners or sealants. Instead, the interior wall 22 is joined to the composite channel 20 based on one of the methods described below and shown in FIGS. 7-9 and 11-15.

Figure 2:
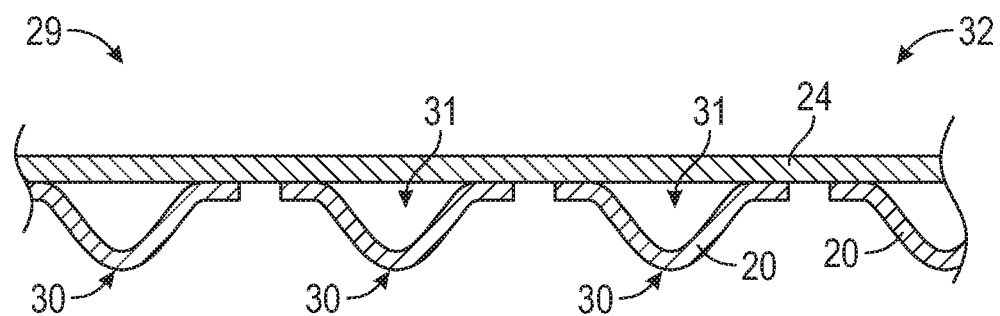
FIG. 2 is an illustration of a wing of an aircraft, where the wing includes a plurality of composite channels that are fuel vent stringers, according to an exemplary embodiment.

FIG. 2 is a cross-sectioned view illustrating a portion of a wing 29 of an aircraft 32, where the wing 29 includes a plurality of vent stringer assemblies 31. In the non-limiting embodiment as shown in FIG. 2, the wing 29 of the aircraft 32 represents the composite panel 24. The composite channels 20 each represent a vent stringer 30. The vent stringers 30 are configured to vent fuel and fuel vapors from aircraft wing fuel tanks (not shown). The interior wall 22 (FIG. 1) is configured to block the flow of the fuel and the fuel vapor. In another example, the composite channel 20 is a fuselage keel stringer of the aircraft 32. Although an aircraft is described, it is to be appreciated that the composite channel 20 is not limited to aviation and may be used in a variety of other applications. For example, in another embodiment, the composite channel 20 is used in a watercraft as a hull stringer.

Turning back to FIG. 1, in one embodiment the composite channel 20 includes a profile 34. The profile 34 defines two opposing sides 36 that taper inwardly towards an end wall 38, and a pair of flanges 40 that are each connected to one of the two opposing sides 36, which is sometimes referred to as a hat-shaped profile. However, it is to be appreciated that the profile 34 shown in FIG. 1 is merely exemplary in nature, and the composite channel 20 may include other cross-sectional profiles as well.

The passageway 28 of the composite channel 20 defines an innermost surface 44, a first open end 48A, and a second open end 48B. The interior wall 22 is disposed within the passageway 28 of the composite channel 20. As mentioned above, the interior wall 22 creates a barrier that blocks the flow of fluid within the passageway. In one embodiment, the interior wall 22 is constructed of composite material and defines an outermost surface 46 that is contiguous with the innermost surface 44 of the passageway. The composite panel 24 is attached to the composite channel 20, where the composite panel 24 closes off an open section 58 of the passageway of the composite channel 20 (the open section 58 of the passageway is visible in FIG. 3B).

In an embodiment, the composite channel 20, the interior wall 22, and the composite panel 24 are each composed of a composite material such as, for example, a carbon fiber reinforced polymer composite. However, in another embodiment, the interior wall 22 is constructed of a metal such as, but not limited to aluminum. In one embodiment, both the composite channel 20 and the interior wall 22 are constructed of identical composite materials. Alternatively, in another embodiment, the composite channel 20 is constructed of a first composite material and the interior wall is constructed of a second material, where the second material is either a composite material or a metal. Although the first composite material and the second material are not identical to one another, the first composite material and the second material both include respective coefficients of thermal expansion that are compatible with one another.

Compatible coefficients of thermal expansion are determined based on specific part appearance and quality standards of the closed composite channel 10. In one embodiment, the closed composite channel 10 has relatively strict appearance and quality requirements. Accordingly, artifacts such as, for example, wrinkling are not permitted during the curing process. As such, compatible coefficients of thermal expansion result in the composite channel 20 and the interior wall 22 expanding together at a rate that does not generally create substantive artifacts during the curing process. However, in another embodiment, the closed composite channel 10 has relatively relaxed appearance and quality requirements. As such, a wider range of compatible coefficients of thermal expansion are allowed, since some artifacts are permissible.

Figure 3A:
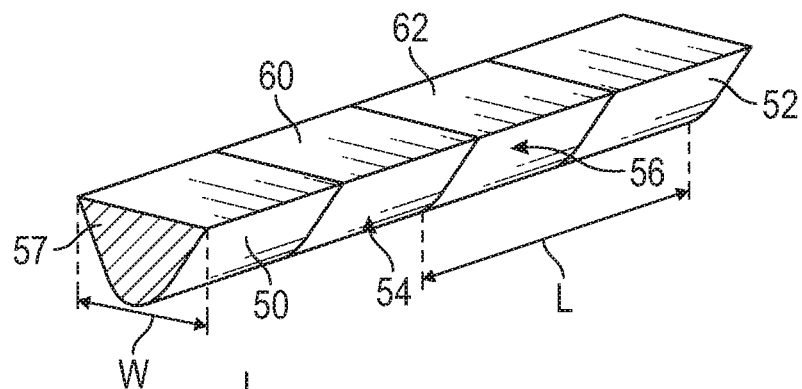
FIG. 3A illustrates a first mandrel, a second mandrel, and one or more composite plies wrapped around respective end portions of both the mandrels, according to an exemplary embodiment.
Figure 3B:
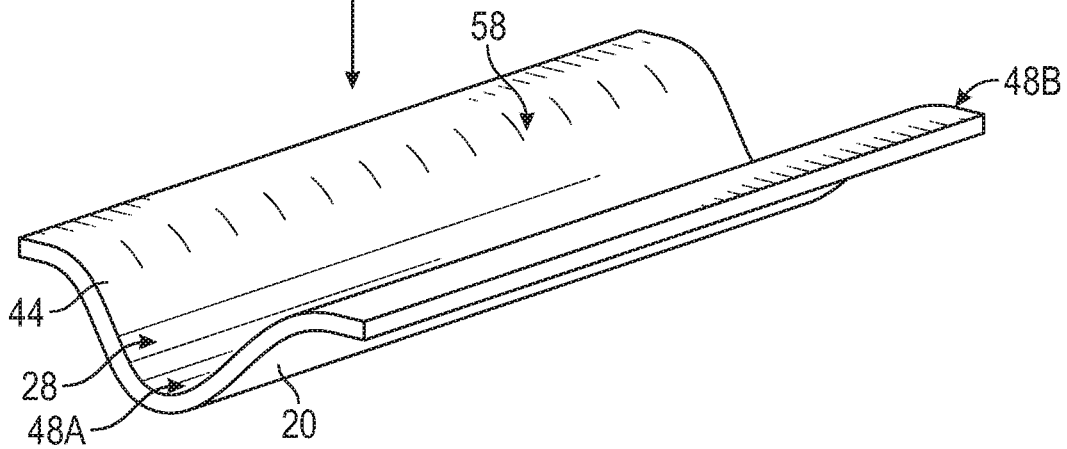
FIG. 3B is an illustration of the composite channel shown in FIG. 1, prior to being closed off by the composite panel, according to an exemplary embodiment.
Figure 3C:
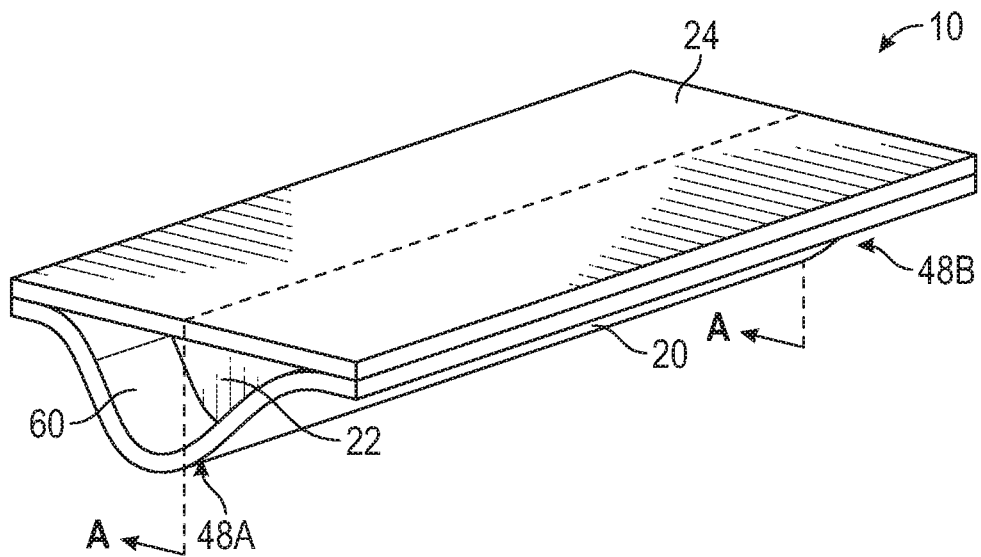
FIG. 3C is an illustration of the composite channel in FIG. 3B where the composite channel has been closed off by the composite panel, according to an exemplary embodiment.

Referring the FIGS. 1 and 3A, the interior wall 22 is created using one or more first composite plies 60 wrapped around a first end portion 54 of a first mandrel 50 and one or more composite plies 62 wrapped around a second end portion 56 of a second mandrel 52. Referring to both FIGS. 3A and 3B, the first mandrel 50 and the second mandrel 52 are both placed into the composite channel 20 either one at a time or, alternatively, at the same time as one another. Referring to FIGS. 3B and 3C, the composite panel 24 is placed over the open section 58 of the passageway 28 of the composite channel 20, which closes off the passageway 28.

Figure 4:
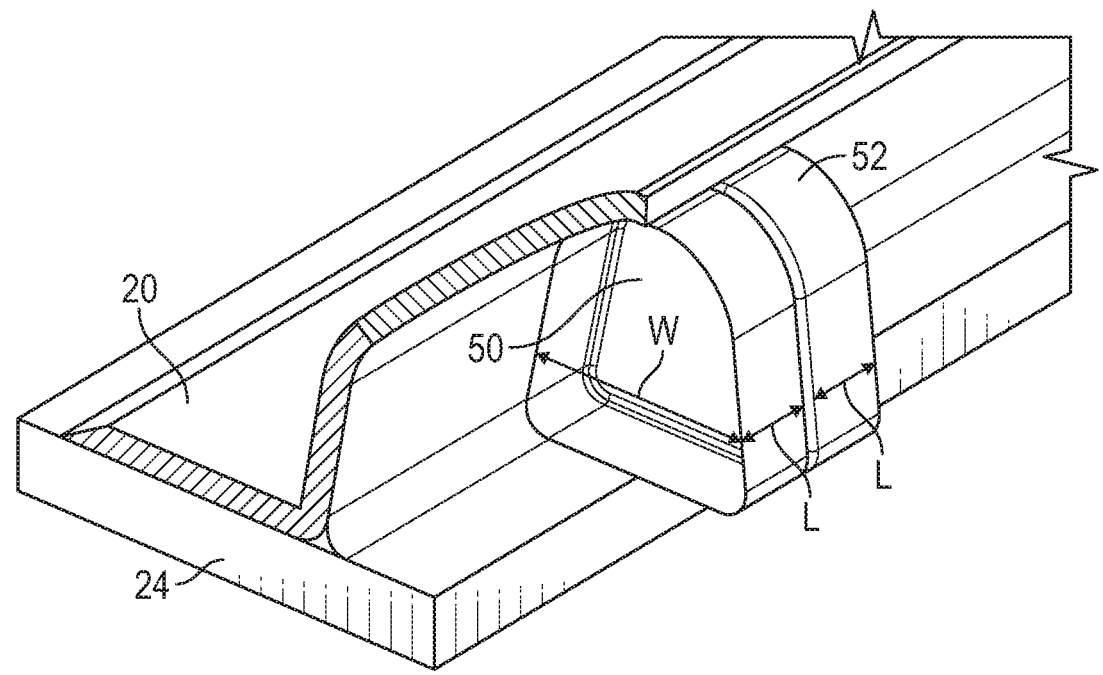
FIG. 4 is an alternative embodiment of one of the mandrels shown in FIG. 3A, according to an exemplary embodiment.

Referring generally to FIGS. 3A, 3B, and 3C, the first mandrel 50 and the second mandrel 52 both include a cross-sectional profile 57 that corresponds to the innermost surface 44 of the composite channel 20. In the embodiment as shown in FIG. 3A, the mandrels 50, 52 both include an elongated profile, where a length L of the mandrels 50, 52 are greater than a width W of the mandrels 50, 52. However, FIG. 4 illustrates a partially sectioned composite channel 20, the composite panel 24, and the mandrels 50, 52. In the embodiment as shown in FIG. 4, the mandrels 50, 52 include a compact profile where the width W is greater than the length L. It is to be appreciated that the mandrels 50, 52 shown in FIGS. 3A and 4 are exemplary in nature, and other geometries and profiles may be used as well.

Referring to FIGS. 3A, 3B, and 3C, the first mandrel 50 is removable from the passageway 28 through the first open end 48A of the composite channel 20, and the second mandrel 52 is removable from the passageway 28 through the second open end 48B of the composite channel 20. Accordingly, if the mandrels 50, 52 include contoured or curved surfaces, then the mandrels 50, 52 are relatively flexible so as to facilitate removal through the respective open ends 48A, 48B of the composite channel 20. For example, the first mandrel 50 and the second mandrel 52 are constructed of a flexible material such as, but not limited to, rubber or an elastomer. Alternatively, the first mandrel 50 and the second mandrel 52 are inflatable bladders. However, if the mandrels 50, 52 are relatively straight and do not have significant contours, then the mandrels 50, 52 are constructed of either a flexible or a rigid material. Some examples of a rigid material include metal and composite material.

In an alternative embodiment, the first mandrel 50 and the second mandrel 52 are both fly-away tooling components that remain within the passageway 28 of the composite channel 20 after the interior wall 22 has been attached to the innermost surface 44 of the composite channel 20. However, it is to be appreciated that the material used for the fly-away tooling components may be porous and allow for the passage of fluid. Therefore, fluids such as fuel and fuel vapor are able to travel through the composite channel 20. Accordingly, some examples of the first mandrel 50 and the second mandrel 52 include, but are not limited to, a rubber mandrel, an inflatable bladder, a composite mandrel, a metal mandrel, and fly-away tooling components.

Figure 5:
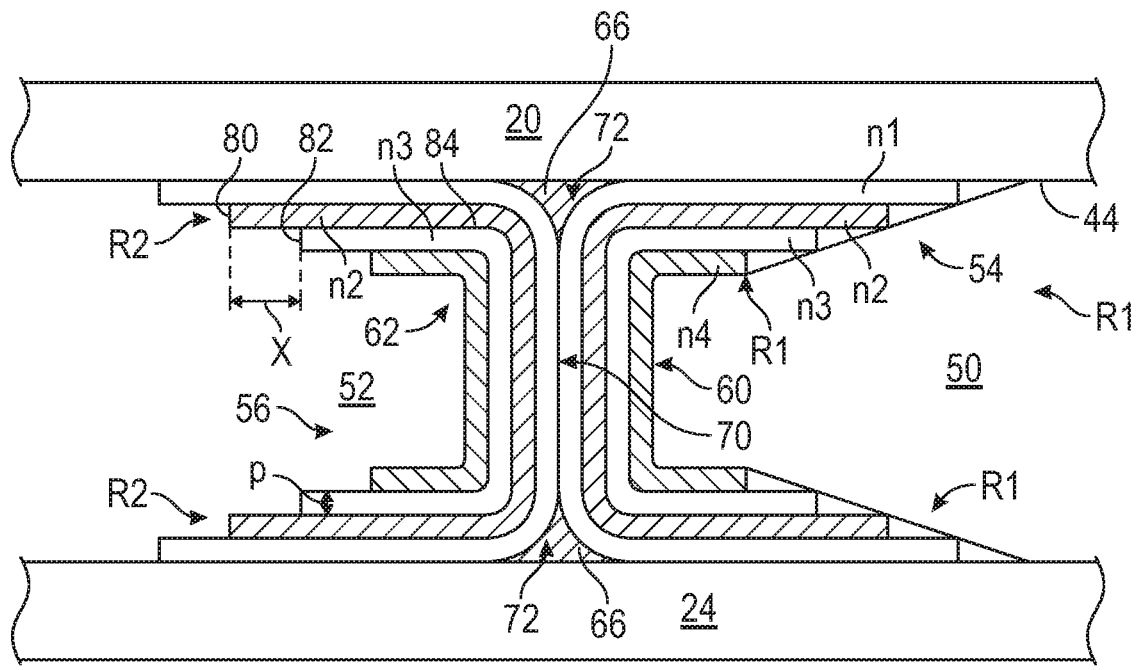
FIG. 5 is an enlarged cross-sectional view taken along section line A-A in FIG. 3C illustrating the first composite plies and the second composite plies arranged into a ramped configuration, according to an exemplary embodiment.

FIG. 5 is an enlarged cross-sectional view taken along section line A-A in FIG. 3C illustrating the first mandrel 50, the second mandrel 52, the one or more first composite plies 60, the one or more second composite plies 62, the composite channel 20, and the composite panel 24. In one embodiment, a radius filler material 66 is placed around a space 72, where the space 72 is formed between an interface 70 where the one or more first composite plies 60 and the one or more second composite plies 62 abut against one another. Specifically, in the exemplary embodiment as shown, the space 72 is a triangular-shaped cavity that exists between the one or more first composite plies 60 and the one or more second composite plies 62. The radius filler material 66 is configured to reduce or prevent instances where the interior wall 22 peels away or separates from the innermost surface 44 of the composite channel 20, which is caused when the composite channel 20 is subjected to relatively high loads or deflection forces. However, in some instances where the composite channel 20 is subjected to relatively low or negligible loads and deflection forces, then the radius filler material 66 may be omitted. For example, if the composite channel 20 is subjected to low air pressures and is not used to bear significant structural loads, then the radius filler material 66 may be omitted.

As seen in FIG. 5, the plurality of first composite plies 60 are arranged in a series of graduated lengths around the first end portion 54 of the first mandrel 50 to create first ramped profile R1 between the innermost surface 44 of the composite channel 20 and the plurality of first composite plies 60. Similarly, the plurality of second composite plies 62 are arranged in a series of graduated lengths around the second end portion 56 of the second mandrel 52 to create a second ramped profile R2 between the innermost surface 44 of the composite channel 20 and the plurality of second composite plies 62. The first ramped profile R1 and the second ramped profile R2 each include a ramp ratio z. In the embodiment as shown in FIG. 5, both ramped profiles R1, R2 have the same ramp ratio z. However, it is to be appreciated that the ramped profiles R1, R2 may have different ramp ratios z instead. Furthermore, although each of the plies n1, n2, n3, n4 include different lengths, in another embodiment a portion of the plies n1, n2, n3, n4 have equal lengths. For example, plies n1 and n2 may have equal lengths, but plies n3 and n4 still have graduated lengths.

In the exemplary embodiment as shown in FIG. 5, both the first ramped profiles R1 and the second ramped profiles R2 are each defined by four plies n1, n2, n3, n4, where the ply n1 contacts the innermost surface 44 of the composite channel 20. However, it is to be appreciated that FIG. 5 is merely exemplary in nature and any number of plies may be used based on the specific application and requirements of the ramp ratio z. Although FIG. 5 illustrates the ply n1 having the longest length and the ply n4 having the shortest length, in another embodiment the ramp ratios z are inverted. Thus, the ply n1 would have the shortest length and the ply n4 would have the longest length.

The ramp ratio z is based on a ply thickness p, a distance x, and a total number of plies. The distance x represents a distance between an end surface 80 of one of the plies n1, n2, n3, n4 and an end surface 82 of a remaining adjacent ply n1, n2, n3, n4. For example, the distance x represents a distance between the end surface 80 of the ply n2 and the end surface 82 of the ply n3. The ply thickness p represents a thickness of either the one or more first composite plies 60 or the one or more second composite plies 62. In the embodiment as shown, the plies n1, n2, n3, n4 are of uniform thickness. However, in another embodiment, the plies n1, n2, n3, n4 may include unequal thicknesses.

Assuming the ply thickness p is the same for each of the plies n1, n2, n3, n4, the ramp ratio z is determined by Equation 1:

$$\text{ramp ratio } z = \frac{(\text{distance } x)(\text{total number of plies})}{(\text{ply thickness } p)(\text{total number of plies})} \quad \text{Equation 1}$$

A higher ramp ratio z results in a more gradual slope. In one non-limiting embodiment, the ramp ratio z ranges from about 100:1 to about 400:1. The ramp ratio z is determined based on pressure drop requirements of the closed composite channel 10, where increasing the ramp ratio z results in a uniform pressure distribution. The ramp ratio z is also based on the quality and inspection requirements of the closed composite channel 10, where increasing the ramp ratio z reduces the occurrence of ply distortions. One example of a ply distortion is a ply wrinkle.

Figure 6:
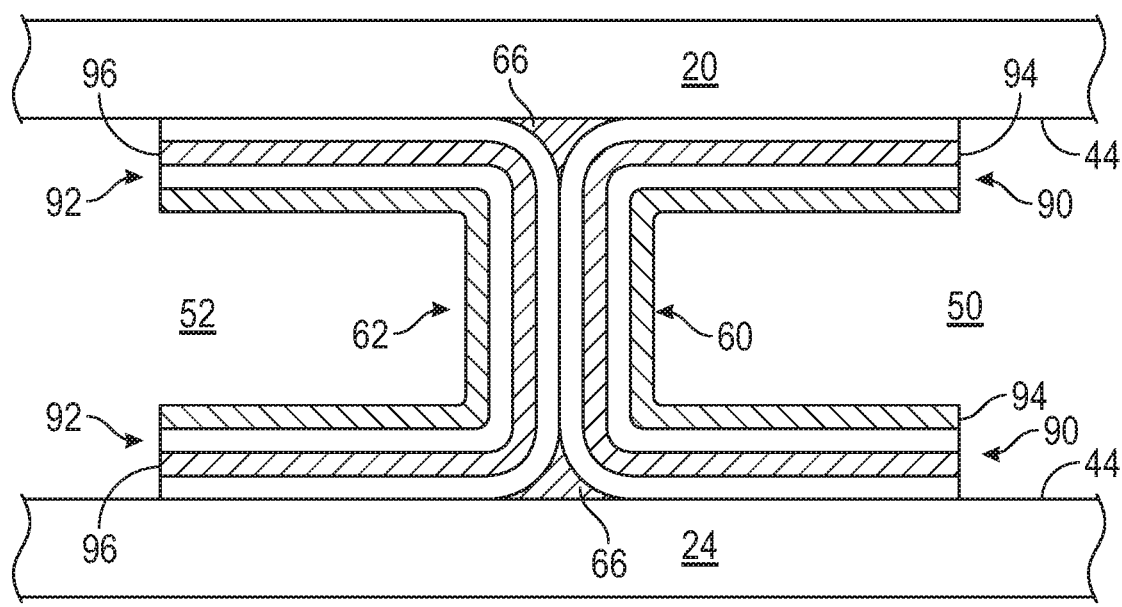
FIG. 6 is a cross-sectional view of an alternative arrangement of the first composite plies and the second composite plies shown in FIG. 5, according to an exemplary embodiment.

FIG. 6 illustrates an alternative to the embodiment shown in FIG. 5. Specifically, instead of the ramped profiles R1, R2 seen in FIG. 5, a first step 90 and a second step 92 are disposed between the innermost surface 44 of the composite channel 20 and the corresponding composite plies 60, 62. Specifically, the plurality of first composite plies 60 are arranged to create a first step 90 between the innermost surface 44 of the composite channel 20 and the plurality of first composite plies 60. Similarly, the plurality of second composite plies 62 are arranged to create a second step 92 between the innermost surface 44 of the composite channel 20 and the plurality of second composite plies 62. The first step 90 defines a vertical surface 94 that is substantially perpendicular to the innermost surface 44 of the composite channel 20. Similarly, the second step 92 define a vertical surface 96 that is substantially perpendicular to the innermost surface 44 of the composite channel 20. It is to be appreciated that each of the steps 90, 92 may be employed in applications that do not have stringent pressure distribution or part quality requirements.

Figure 7:
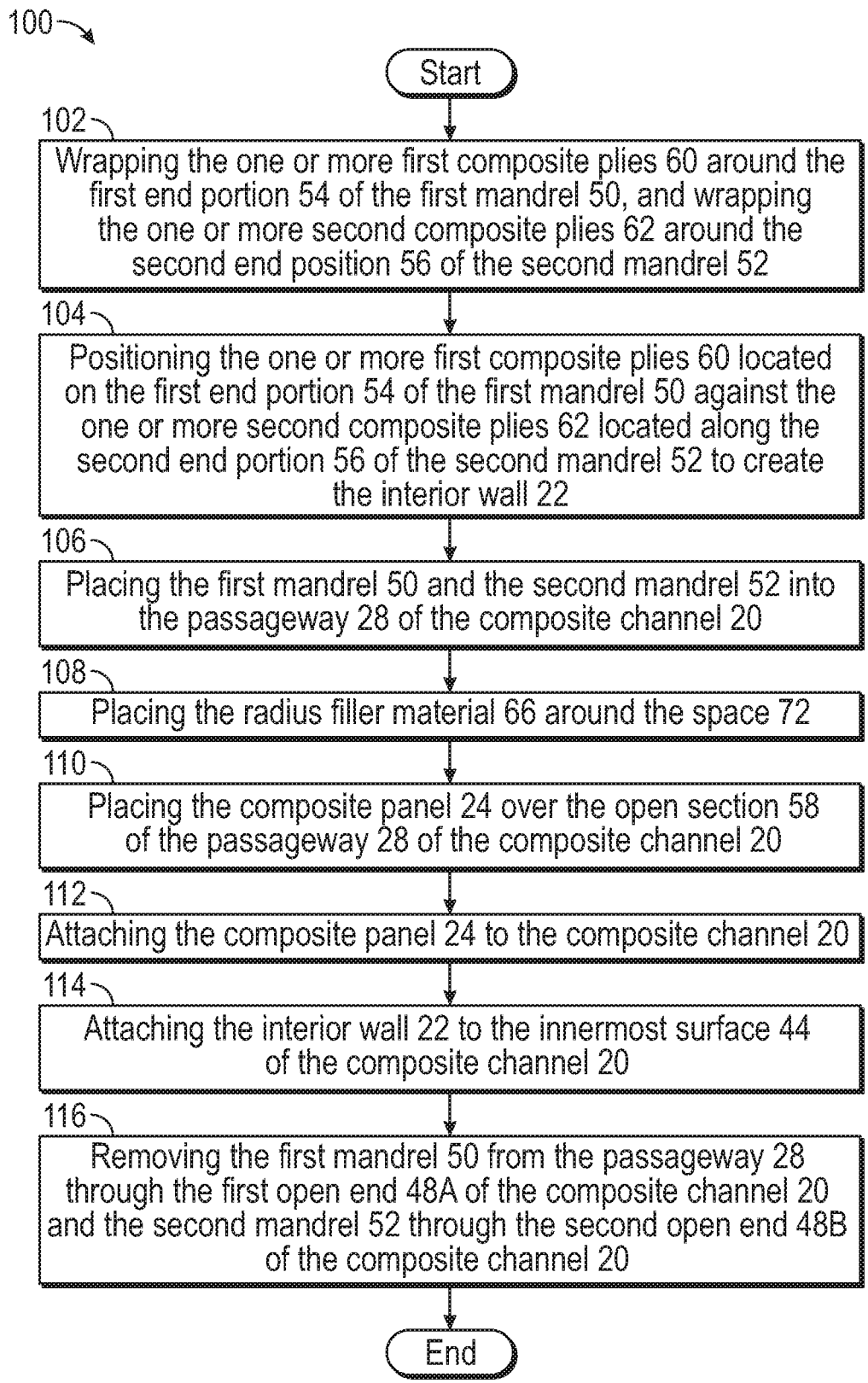
FIG. 7 is a process flow diagram illustrating a method of joining the interior wall, the composite channel, and the panel together to create the closed composite channel, according to an exemplary embodiment.

FIG. 7 is an exemplary process flow diagram illustrating a method 100 of joining the interior wall 22 and the composite channel 20. It is to be appreciated that the interior wall 22 is joined to the composite channel 20 prior to the composite panel 24 closing off the passageway of the composite channel 20, which is unlike some conventional systems that require an individual to install an interior wall or dam through an opening in the composite channel.

Referring generally to FIGS. 1, 3A, 3B, 3C, and 7, the method 100 begins at block 102. In block 102, the one or more first composite plies 60 are wrapped around the first end portion 54 of the first mandrel 50. Similarly, the one or more first composite plies 60 are wrapped around the second end portion 54 of the second mandrel 52. The method 100 then proceeds to block 104.

In block 104, the one or more first composite plies 60 located on the first end portion 54 of the first mandrel 50 are positioned against the one or more second composite plies 62 located on the second end portion 56 of the second mandrel 52 to create the interior wall 22 (shown in FIG. 1). It is to be appreciated that although the method 100 describes the interior wall 22 being created prior to the mandrels 50, 52 being placed within the passageway 28 of the composite channel 20, in another embodiment the interior wall 22 may be created after the mandrels 50, 52 are placed within the passageway 28 of the composite channel 20. The method 100 may then proceed to block 106.

In block 106, the first mandrel 50 and the second mandrel 52 are placed into the passageway 28 of the composite channel 20, where the interior wall 22 created by the one or more first composite plies 60 and the one or more second composite plies 62 creates a barrier to block the flow of fluid within the passageway 28 of the composite channel 20. The method 100 may then proceed to block 108.

In block 108, the radius filler material 66 is placed around the space 72, where the space 72 is formed between an interface 70 where the one or more first composite plies 60 and the one or more second composite plies 62 abut one another (seen in FIG. 5). As mentioned above, the radius filler material 66 may be omitted in some embodiments. It is also to be appreciated that if a solid radius filler material 66 is used, then block 108 precedes block 106. However, if the radius filler material 66 is applied by an injection tool, then block 108 may come after block 106. The method 100 may then proceed to block 110.

In block 110, the composite panel 24 is placed over the open section 58 of the passageway of the composite channel 20 to close off the passageway 28. The method 100 may then proceed to block 112.

In block 112, the composite panel 24 is attached to the composite channel 20. The composite panel 24 may be attached using any number of joining techniques described below. The method 100 may then proceed to block 114.

In block 114, the interior wall 22 is attached to the innermost surface 44 of the composite channel 20. As explained below, the interior wall 22 is joined to the composite channel 20 using any number of joining techniques. The method 100 may then proceed to block 116.

In block 116, the first mandrel 50 is removed from the passageway through the first open end 48A of the composite channel 20, and the second mandrel 52 is removed from the passageway through the second open end 48B of the composite channel 20. The method 100 may then terminate.

Figure 8:
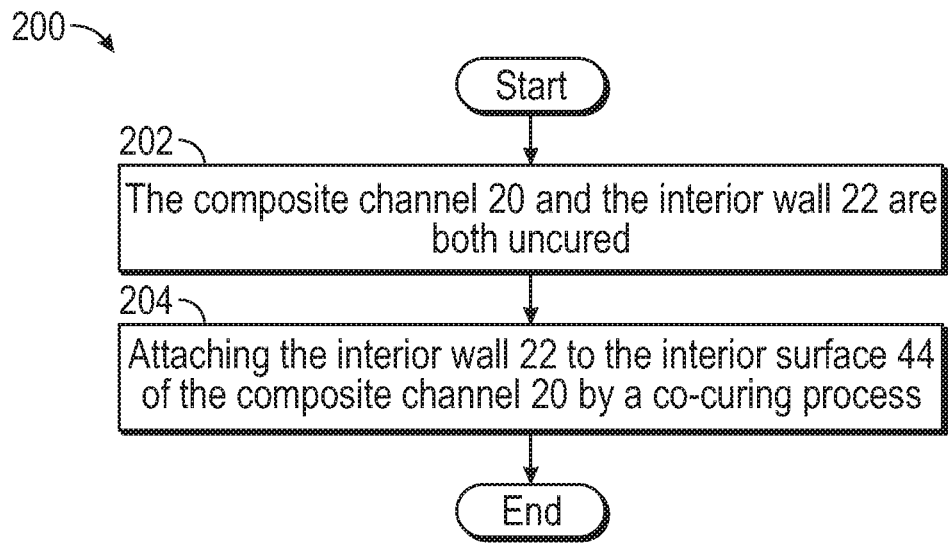
FIG. 8 is a process flow diagram illustrating a method of joining the interior wall and the composite channel together when both components are uncured, according to an exemplary embodiment.

FIG. 8 is an exemplary process flow diagram illustrating a method 200 for attaching the interior wall 22 to the innermost surface 44 of the composite channel 20 based on a co-curing process. Referring to FIGS. 1, 3A, 3B, 3C, and 8, the method 200 begins at block 202. In block 202, the composite channel 20 and the interior wall 22 are both uncured when the first mandrel 50 and the second mandrel 52 are inserted into the passageway 28 of the composite channel 20. The method 200 may then proceed to block 204.

In block 204, the interior wall 22 is attached to the innermost surface 44 of the composite channel 20 by a co-curing process. It is to be appreciated that any number of curing processes may be used. The curing process may occur under elevated temperature and pressure conditions using devices such as, but not limited to, an oven, a vacuum bag, or an autoclave. Other examples of curing processes include, but are not limited to, electron beam, ultraviolet (UV) radiation, x-ray, and microwave technologies. The method 200 may then end.

Referring generally to FIGS. 1, 3A, 3B, and 3C, in another embodiment the composite channel 20 is cured and the interior wall 22 is uncured. Thus, in an embodiment, the interior wall 22 is attached to the innermost surface 44 of the composite channel 20 using an adhesive such as, but not limited to, an epoxy resin Alternatively, in another embodiment, no adhesive is used. Instead, a bond forms between the innermost surface 44 of the composite channel 20 and the interior wall 22 as the interior wall 22 cures. However, it is to be appreciated the bond formed between one uncured component (i.e., the interior wall 22) and a cured component (i.e., the composite channel 20) is weaker when compared to a bond using adhesive. Accordingly, adhesive may be used to improve part quality integrity of the bond.

Figure 9:
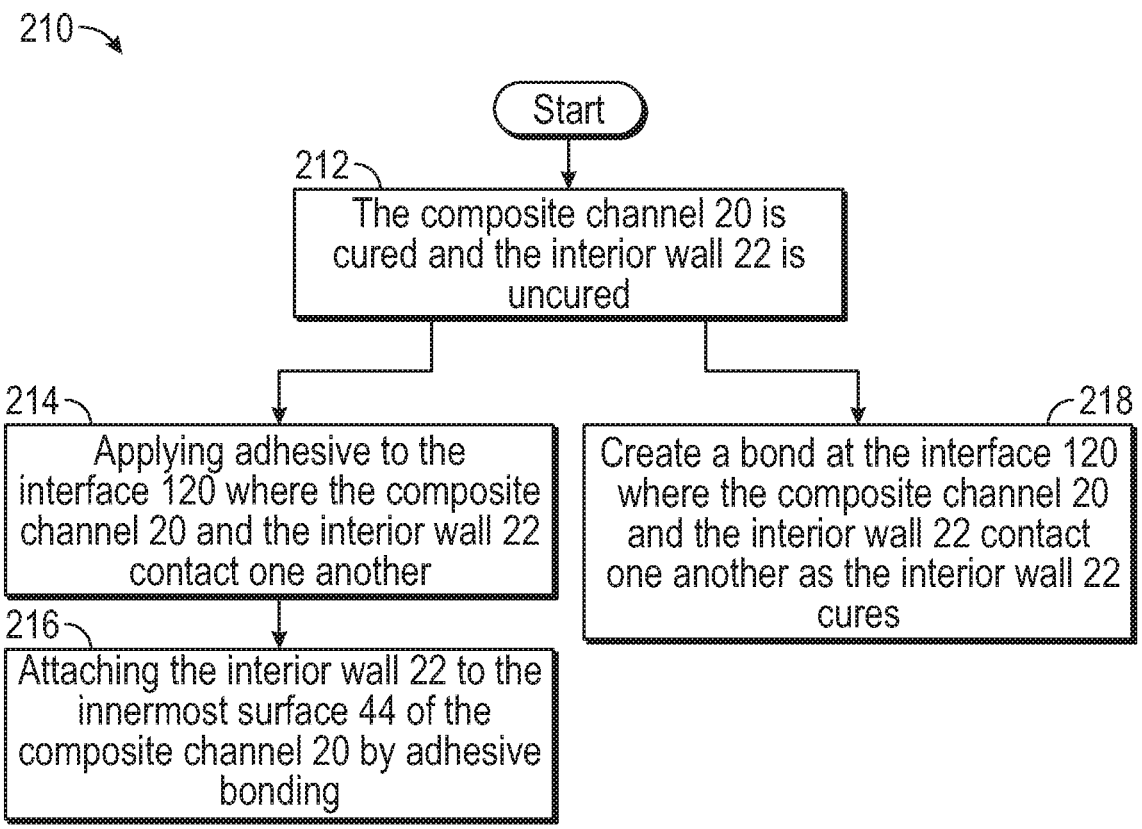
FIG. 9 is a process flow diagram illustrating a method of joining the interior wall and the composite channel together where the composite channel is cured and the interior wall is uncured, according to an exemplary embodiment.
Figure 10:
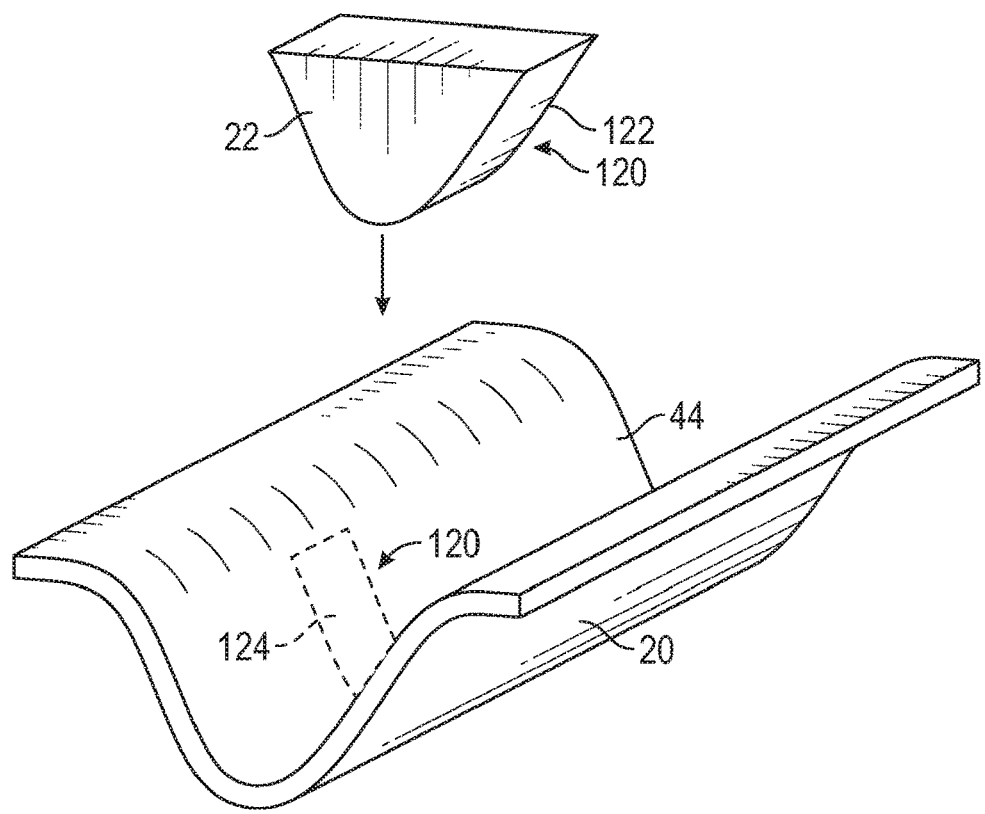
FIG. 10 is an exploded view of the interior wall and the composite channel, according to an exemplary embodiment.

FIG. 9 is an exemplary process flow diagram illustrating a method 220 for joining the composite channel 20 to the interior wall 22 when the composite channel 20 is cured and the interior wall 22 is uncured. FIG. 10 is an exploded perspective view of the composite channel 20 and the interior wall 22. An adhesive (not shown) is applied to an interface 120 where the composite channel 20 and the interior wall 22 contact one another. Specifically, the interior wall 22 defines an outer peripheral side surface 122 that contacts a portion 124 of the innermost surface 44 of the composite channel 20. The adhesive is applied to the outer peripheral side surface 122 of the interior wall 22, the portion 124 of the innermost surface 44 of the composite channel 20, or both the outer peripheral side surface 122 and the portion 124 of the innermost surface 44.

Referring to FIGS. 3A, 9, and 10, the method 210 begins at block 212. In block 212, the composite channel 20 is cured and the interior wall 22 is uncured when the first mandrel 50 and the second mandrel 52 (FIG. 3A) are inserted into the passageway 28 of the composite channel 20. The method 210 then proceeds to either block 214 or 218.

In block 214, adhesive is applied to the interface 120 where the composite channel 20 and the interior wall 22 contact one another. As mentioned above, the adhesive is applied to the to the outer peripheral side surface 122 of the interior wall 22, the portion 124 of the innermost surface 44 of the composite channel 20, or both the outer peripheral side surface 122 and the portion 124 of the innermost surface 44. The method 210 then proceeds to block 216.

In block 216, the interior wall 22 is attached to the innermost surface 44 of the composite channel by an adhesive bond. The method 210 may then terminate.

Alternatively, in another embodiment, the method 210 proceeds from block 212 to block 218. In block 218, a bond is created at the interface 120 between the composite channel 20 and the interior wall 22 as the interior wall 22 cures. The method 210 then terminates.

Figure 11:
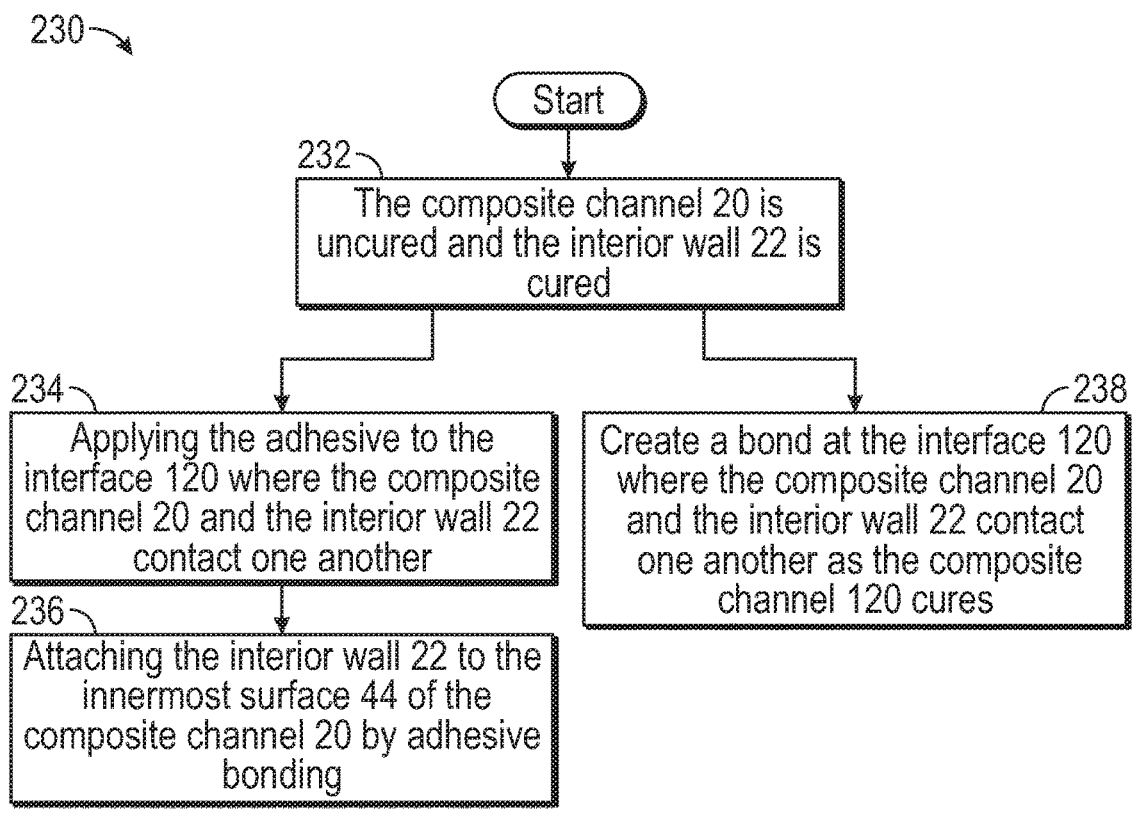
FIG. 11 is a process flow diagram illustrating a method of joining the interior wall and the composite channel together where the composite channel is uncured and the interior wall is cured, according to an exemplary embodiment.

In still another embodiment, the composite channel 20 is uncured and the interior wall 22 is cured when the first mandrel 50 and the second mandrel 52 are inserted into the passageway 28 of the composite channel 20. FIG. 11 is an exemplary process flow diagram illustrating a method 230 for joining the composite channel 20 to the interior wall 22 when the composite channel 20 is uncured and the interior wall 22 is cured. Referring to FIGS. 3A, 10, and 11, the method 230 begins at block 232. In block 232 the composite channel 20 is uncured and the interior wall 22 is cured. The method 230 then proceeds to either block 234 or 238.

In block 234, adhesive is applied to the interface 120 where the composite channel 20 and the interior wall 22 contact one another. As mentioned above, the adhesive is applied to the to the outer peripheral side surface 122 of the interior wall 22, the portion 124 of the innermost surface 44 of the composite channel 20, or both the outer peripheral side surface 122 and the portion 124 of the innermost surface 44. The method 230 then proceeds to block 236.

In block 236, the interior wall 22 is attached to the innermost surface 44 of the composite channel by an adhesive bond. The method 230 may then terminate.

Alternatively, in another embodiment, the method 230 proceeds from block 232 to block 238. In block 238, a bond is created at the interface 120 between the composite channel 20 and the interior wall 22 as the composite channel 20 cures. The method 230 then terminates.

In yet another embodiment, both the composite channel 20 and the interior wall 22 are cured. Therefore, adhesive is required to join the composite channel 20 to the interior wall 22. It is to be appreciated that any of the afore-mentioned joining processes described to attach the composite channel 20 to the interior wall 22 may also be used to attach the composite panel 24 to the composite channel 20. Thus, the composite panel 24 may be cured or uncured. In an embodiment, adhesive is used to attach the composite panel 24 to the innermost surface 44 of the composite channel 20 of the composite channel 20. More specifically, if adhesive is used to attach the composite channel 20 to the interior wall 22, then adhesive is usually also used to attached the composite panel 24 to the composite channel 20 as well, since adhesive would already be applied to the composite plies 60, 62.

Figure 12:
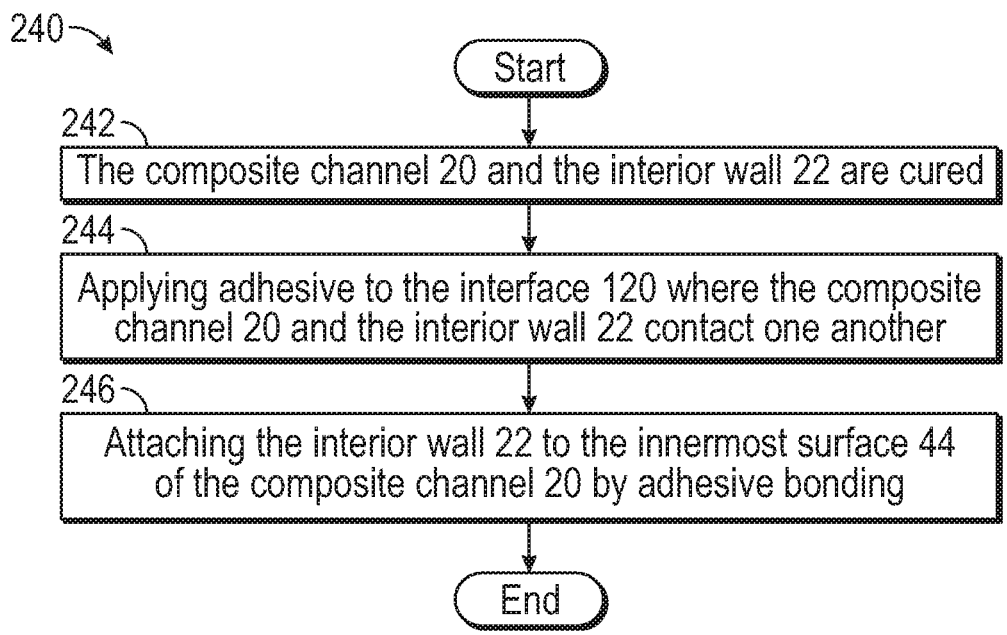
FIG. 12 is a process flow diagram illustrating a method of joining the interior wall and the composite channel together where both components are cured, according to an exemplary embodiment.

FIG. 12 is an exemplary process flow diagram illustrating a method 240 for joining the composite channel 20 to the interior wall 22 when the composite channel 20 and the interior wall 22 are both cured. Referring to FIGS. 3A, 10, and 12, the method 240 begins at block 242. In block 242 the composite channel 20 and the interior wall 22 are both cured when the first mandrel 50 and the second mandrel 52 are inserted into the passageway 28 of the composite channel 20. The method 240 may then proceed to block 244.

In block 244, adhesive is applied to the interface 120 where the composite channel 20 and the interior wall 22 contact one another. The method 240 may then proceed to block 246.

In block 246, the interior wall 22 is attached to the innermost surface 44 of the composite channel 20 by adhesive bonding. The method 240 then terminates.

Figure 13:
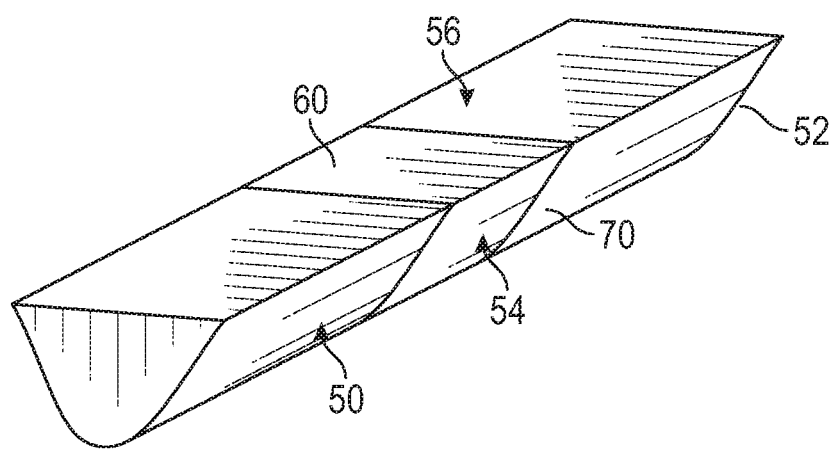
FIG. 13 is an alternative embodiment of FIG. 3A, where plies are only wrapped around one of the mandrels, according to an exemplary embodiment.
Figure 14:
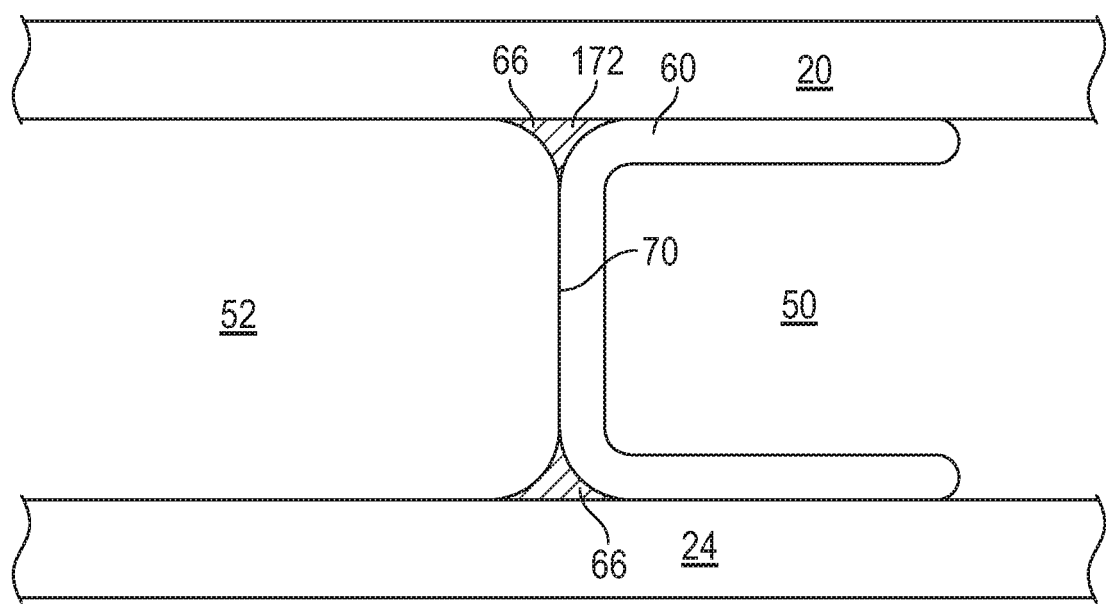
FIG. 14 is an alternative embodiment of FIG. 5, where the interior wall is formed by plies disposed around the first end portion of the first mandrel, according to an exemplary embodiment.

FIGS. 13 and 14 illustrate an alternative approach for creating the interior wall 22. Specifically, in the embodiment as shown in FIGS. 13 and 14, the interior wall 22 is created by only one instead of two different sets of composite plies. Specifically, as seen in FIG. 13, the interior wall 22 is created using one or more first composite plies 60 wrapped around the first end portion 54 of the first mandrel 50, where an end surface 140 of the second end portion 56 abuts against the first composite plies 60. The first mandrel 50 and the second mandrel 52 are both placed into the composite channel 20 (seen in FIG. 3B) either one at a time or, alternatively, at the same time as one another.

Referring to FIG. 14, in an embodiment the radius filler material 66 is placed around a space 172, where the space 172 is formed between an interface 70 where the one or more first composite plies 60 and the end surface 140 of the second mandrel 52 abut one another. As mentioned above, in some instances where the composite channel 20 is subjected to relatively low or negligible loads and deflection forces, then the radius filler material 66 may be omitted.

Figure 15:
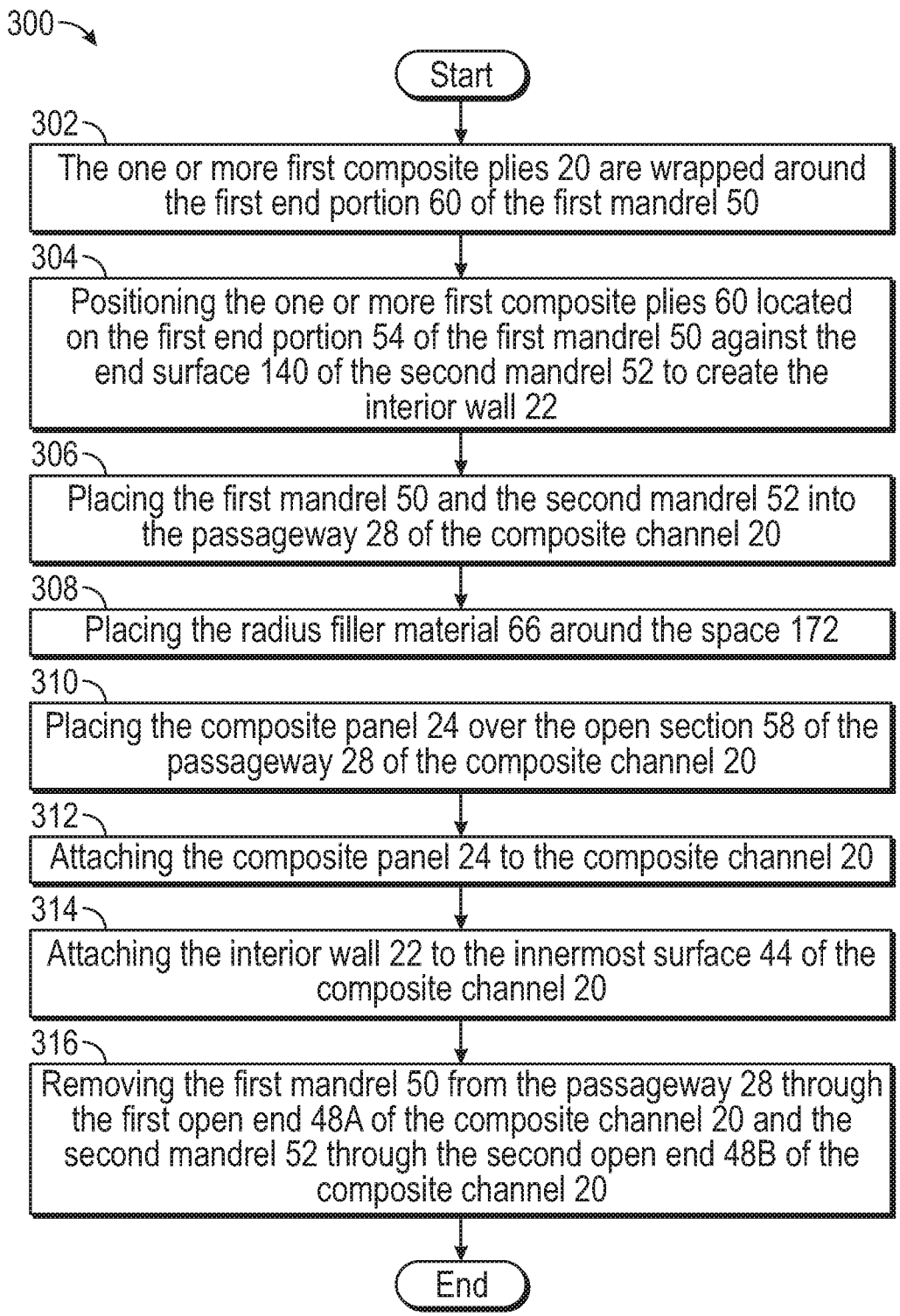
FIG. 15 is an alternative embodiment of the process flow diagram shown in FIG. 7 where plies are only wrapped around one of the mandrels, according to an exemplary embodiment.

FIG. 15 is an exemplary process flow diagram illustrating a method 300 for joining the interior wall 22 and the composite channel 20 together. Referring generally to FIGS. 1, 3B, 13, 14, and 15, the method 300 begins at block 302. In block 302, the one or more first composite plies 60 are wrapped around the first end portion 54 of the first mandrel 50. The method 300 then proceeds to block 304.

In block 304, the one or more first composite plies 60 located on the first end portion 54 of the first mandrel 50 are positioned against the end surface 140 of the second mandrel 52 to create the interior wall 22 (shown in FIG. 1). The method 300 may then proceed to block 306.

In block 306, the first mandrel 50 and the second mandrel 52 are placed into the passageway 28 of the composite channel 20, where the interior wall 22 created by the one or more first composite plies 60 creates a barrier to block the flow of fluid within the passageway 28 of the composite channel 20. The method 300 may then proceed to block 308.

In block 308, the radius filler material 66 is placed around the space 172, where the space 172 is formed between an interface 70 where the one or more first composite plies 60 and the end surface 140 of the second mandrel 52 abut one another. As mentioned above, the radius filler material 66 may be omitted in some embodiments. It is also to be appreciated that if a solid radius filler material 66 is used, then block 308 precedes block 306. However, if the radius filler material 66 is applied by an injection tool, then block 308 may come after block 106. The method 300 may then proceed to block 310.

In block 310, the composite panel 24 is placed over the open section 58 of the passageway 28 of the composite channel 20 to close off the passageway 28. The method 300 may then proceed to block 312.

In block 312, the composite panel 24 is attached to the composite channel 20. The composite panel 24 may be attached using any number of joining techniques described above. The method 300 may then proceed to block 314.

In block 314, the interior wall 22 is attached to the innermost surface 44 of the composite channel 20. As explained below, the interior wall 22 is joined to the composite channel 20 using any number of joining techniques. The method 300 may then proceed to block 316.

In block 316, the first mandrel 50 is removed from the passageway 28 through the first open end 48A of the composite channel 20, and the second mandrel 52 is removed from the passageway through the second open end 48B of the composite channel 20. The method 300 may then terminate.

Figure 16A:
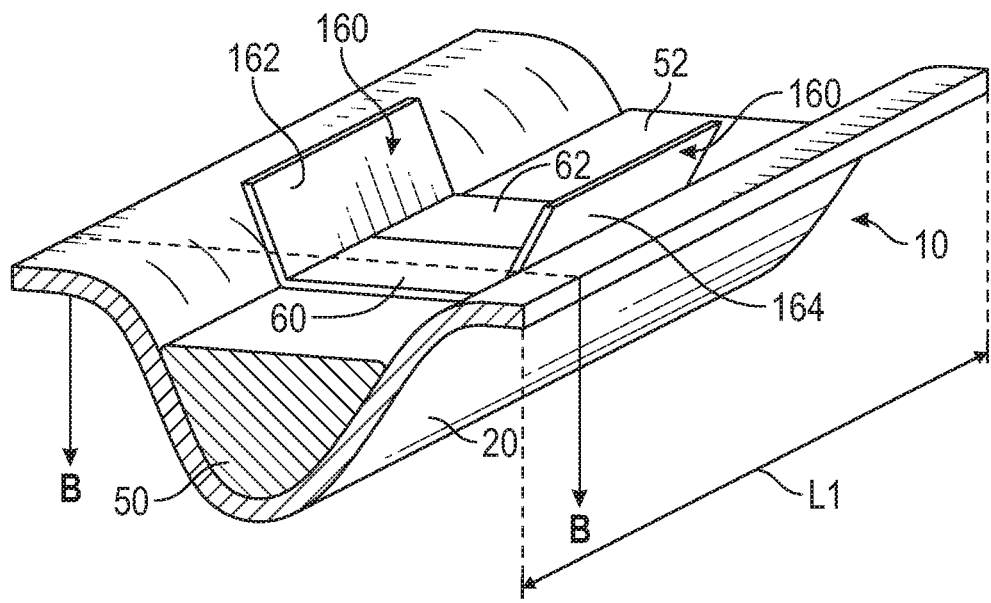
FIG. 16A is a perspective view of another embodiment of the composite channel where one or more wrap plies are disposed between the composite channel and the mandrels, according to an exemplary embodiment.
Figure 16B:
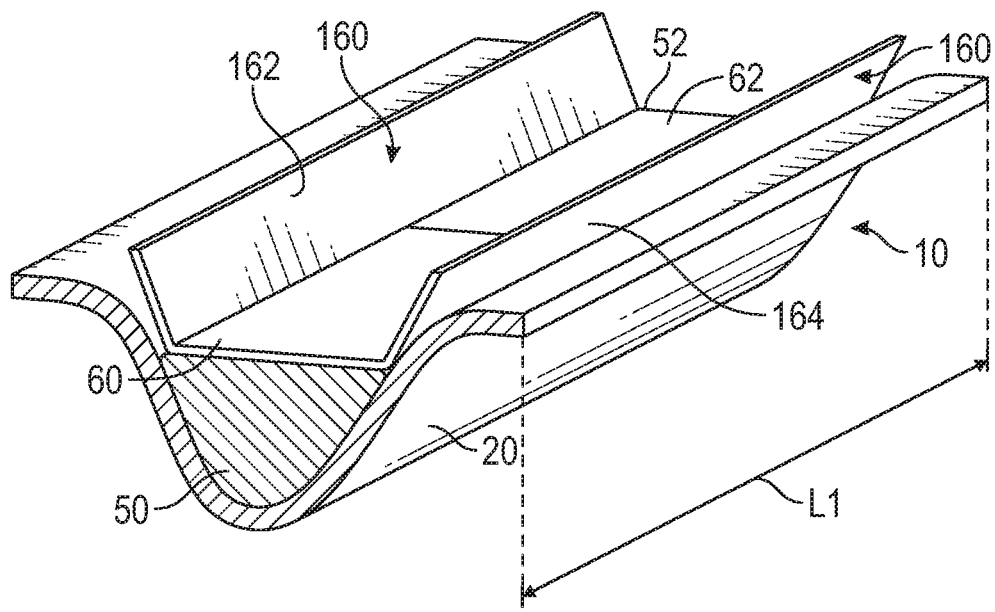
FIG. 16B is an alternative embodiment of the composite channel shown in FIG. 16A where one or more wrap plies extend along the entire length of the composite channel, according to an exemplary embodiment.
Figure 17:
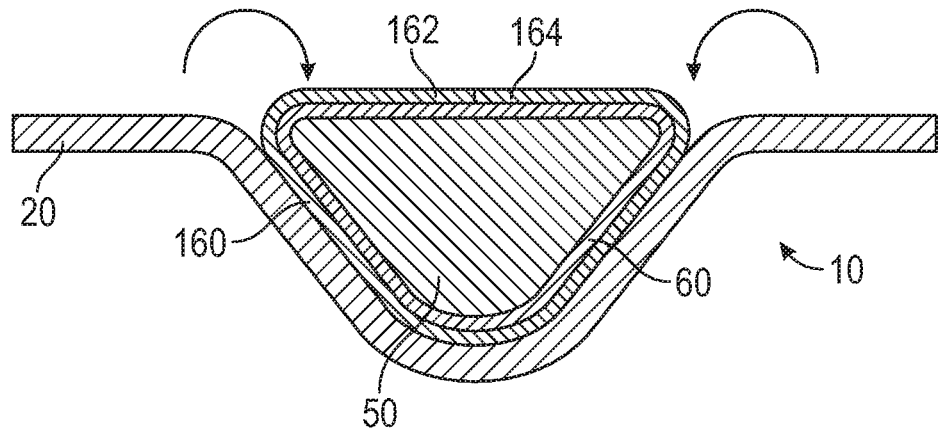
FIG. 17 is an enlarged cross-sectional view taken along section line B-B in FIG. 16A, according to an exemplary embodiment.

FIGS. 16A, 16B, and 17 illustrate yet another embodiment of the closed composite channel 10 prior to the composite panel 24 being attached (FIGS. 3B and 3C). In the embodiment as shown in FIGS. 16A, 16B, and 17, one or more wrap plies 160 are disposed between the innermost surface 44 of the passageway 28 of the composite channel 20 and the composite plies 60, 62. Specifically, FIG. 16A is a perspective view of the composite channel 20 prior to folding a first end 162 and a second end 164 of the one or more wrap plies 160 over the mandrels 50, 52. FIG. 17 is an enlarged cross-sectional view taken along section line B-B in FIG. 16A, after the first end 162 and the second end 164 of the one or more wrap plies 160 are folded over the mandrels 50, 52.

In the embodiment as shown in FIG. 16A, the one or more wrap plies 160 extend along only a portion of a length L1 of the composite channel 20. However, in an alternative embodiment as shown in FIG. 16B, the one or more wrap plies 160 extend along the entire length L1 of the composite channel 20. Thus, the composite panel 24 (FIG. 1) is not required to close off the passageway 28 (FIG. 1).

Figure 18:
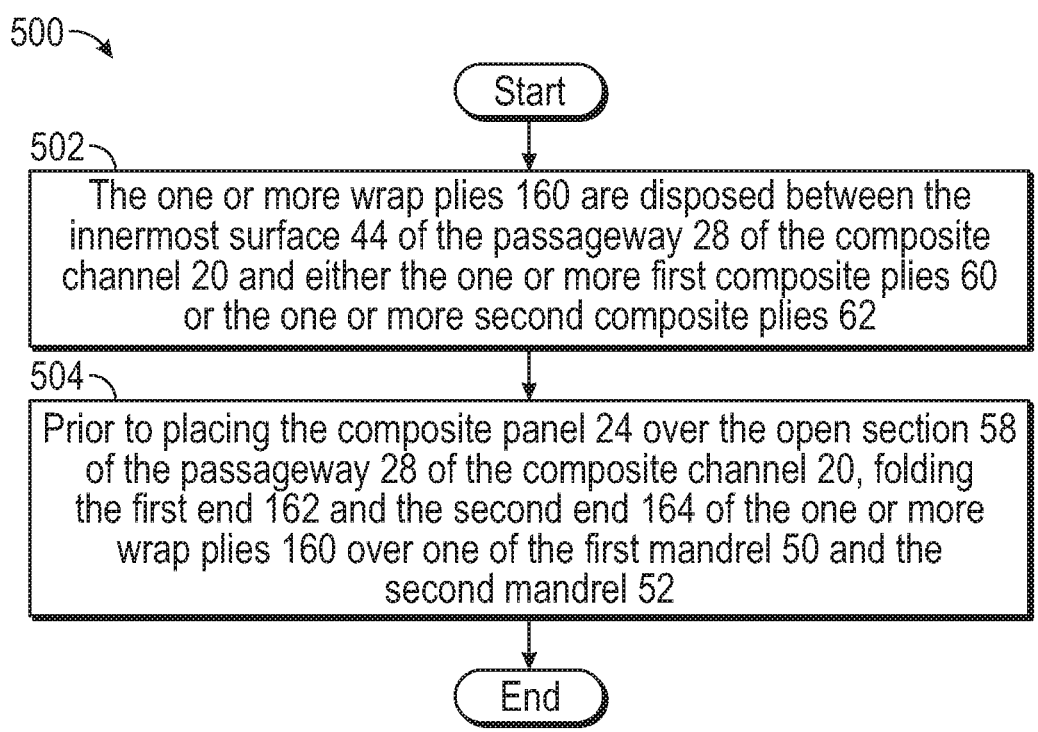
FIG. 18 is a process flow diagram illustrating a method of folding the one or more wrap plies over the mandrels, according to an exemplary embodiment.

FIG. 18 is a process flow diagram illustrating a method 500 of wrapping the one or more composite plies 160 over composite plies 60, 62. Referring to FIGS. 16A, 16B, 17, and 18, the method 500 begins at block 502. In block 502, the one or more wrap plies 160 are disposed between the innermost surface 44 of the passageway 28 of the composite channel 20 and either the one or more first composite plies 60 or the one or more second composite plies 62. The method 500 may then proceed to block 504.

In block 504, prior to placing the composite panel 24 over the open section 58 of the passageway 28 of the composite channel 20, the first end 162 and the second end 164 of the one or more wrap plies 160 are folded over either the first mandrel 50 or the second mandrel 52. The method 500 may then terminate.

Referring generally to the figures, the present disclosure describes a closed composite channel having an interior wall that is integrated with the composite channel. The disclosed methods for joining the interior wall to the composite channel do not require fasteners and sealants, and therefore result in a simplified approach to install the interior wall. In addition to omitting fasteners and sealants, the disclosed technique also obviates the need to perform surface finishing operations such as sanding, priming, and painting upon the innermost surface of the composite channel prior to installing the interior wall. Moreover, the interior wall is joined to the composite channel prior to the passageway of the composite channel being closed off, which in turn results in a less time consuming and more ergonomic approach for joining the interior wall to the composite channel. In contrast, some conventional techniques require an individual to access the inside wall of a composite channel such as a vent stringer through an opening located on an outer surface, which is often laborious, time consuming, and awkward for an individual to access. Finally, it should also be appreciated that some conventional composite channels only have an opening so that an individual may access the inside of the composite channel to install the interior wall. The disclosed approach of installing the interior wall eliminates the need for an opening, which in turn improves structural integrity of the composite channel.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of joining an interior wall and a composite channel together, the method comprising:
   wrapping one or more first composite plies around a first end portion of a first mandrel;
   wrapping one or more second composite plies around a second end portion of a second mandrel;
   positioning the one or more first composite plies located on the first end portion of the first mandrel against the one or more second composite plies located on the second end portion of the second mandrel to create the interior wall;

providing a composite channel having a passageway, wherein the passageway of the composite channel includes an open section that defines a non-confined volume of empty space;

inserting the first mandrel and the second mandrel into the passageway of the composite channel, wherein the interior wall created by the one or more first composite plies and the one or more second composite plies creates a barrier to block a flow of fluid within the passageway of the composite channel;

placing a composite panel over the open section of the passageway of the composite channel to close off the passageway;

attaching the composite panel to the composite channel; and attaching the interior wall to the composite channel after the first mandrel and the second mandrel have been inserted into the passageway of the composite channel, wherein the interior wall is attached to an innermost surface of the passageway.

2. The method of claim 1, further comprising:
removing the first mandrel from the passageway through a first open end of the composite channel; and
removing the second mandrel from the passageway through a second open end of the composite channel.

3. The method of claim 1, wherein the composite channel and the interior wall are both uncured when the first mandrel and the second mandrel are inserted into the passageway of the composite channel.

4. The method of claim 3, further comprising:
attaching the interior wall to the innermost surface of the composite channel by a co-curing process.

5. The method of claim 1, wherein the composite channel is cured and the interior wall is uncured when the first mandrel and the second mandrel are inserted into the passageway of the composite channel.

6. The method of claim 5, further comprising:
applying adhesive to an interface where the composite channel and the interior wall contact one another; and
attaching the interior wall to the innermost surface of the composite channel by adhesive bonding.

7. The method of claim 5, further comprising:
creating a bond at an interface where the composite channel and the interior wall contact one another as the interior wall cures.

8. The method of claim 1, wherein the composite channel is uncured and the interior wall is cured when the first mandrel and the second mandrel are inserted into the passageway of the composite channel.

9. The method of claim 8, further comprising:
applying adhesive to an interface where the composite channel and the interior wall contact one another; and
attaching the interior wall to the innermost surface of the composite channel by adhesive bonding.

10. The method of claim 8, further comprising:
creating a bond at an interface where the composite channel and the interior wall contact one another as the composite channel cures.

11. The method of claim 1, wherein the composite channel and the interior wall are both cured when the first mandrel and the second mandrel are inserted into the passageway of a composite channel.

12. The method of claim 11, further comprising:
applying adhesive to an interface where the composite channel and the interior wall contact one another; and
attaching the interior wall to the innermost surface of the composite channel by adhesive bonding.

13. The method of claim 1, further comprising:
placing a radius filler material around a space formed between an interface where the one or more first composite plies and the one or more second composite plies abut one another.

14. The method of claim 1, wherein the first mandrel and the second mandrel are selected from the group comprising of: a rubber mandrel, an inflatable bladder, a composite mandrel, a metal mandrel, and fly-away tooling components.

15. The method of claim 1, wherein one or more wrap ply is disposed between the innermost surface of the passageway of the composite channel and either the one or more first composite plies or the one or more second composite plies.

16. The method of claim 15, further comprising:
prior to placing the composite panel over the open section of the passageway of the composite channel, folding a first end and a second end of the one or more wrap ply over either the first mandrel or the second mandrel.

17. The method of claim 1, wherein the interior wall is constructed from a composite material.

18. A method of joining an interior wall and a composite channel together, the method comprising:
wrapping one or more first composite plies around a first end portion of a first mandrel;
positioning the one or more first composite plies located on the first end portion of the first mandrel against a second end portion of a second mandrel to create the interior wall;
providing a composite channel having a passageway, wherein the passageway of the composite channel includes an open section that defines a non-confined volume of empty space;
inserting the first mandrel and the second mandrel into the passageway of the composite channel, wherein the interior wall created by the one or more first composite plies creates a barrier to block a flow of fluid within the passageway of the composite channel;
placing a composite panel over the open section of the passageway of the composite channel to close off the passageway;
attaching the composite panel to the composite channel; and
attaching the interior wall to the composite channel after the first mandrel and the second mandrel have been inserted into the passageway of the composite channel, wherein the interior wall is attached to an innermost surface of the passageway.

19. The method of claim 18, wherein the interior wall is constructed from a composite material.

20. The method of claim 18, further comprising:
placing a radius filler material around a space, wherein the space is formed between an interface where the one or more first composite plies and an end surface of the second mandrel abut one another.

* * * * *